United States Patent [19]

Bruce et al.

[11] Patent Number: 5,085,929
[45] Date of Patent: Feb. 4, 1992

[54] GYPSUM BOARD

[75] Inventors: R. Bruce, Brantford; Dimitrios Mitakidis, Oakville, both of Canada

[73] Assignee: Domtar Inc., Montreal, Canada

[21] Appl. No.: 311,908

[22] Filed: Feb. 17, 1989

[51] Int. Cl.⁵ .............................................. B32B 3/26
[52] U.S. Cl. .................................. 428/309.9; 156/39; 156/43; 156/45; 428/310.5; 428/312.2; 428/312.4; 428/314.4; 428/318.6; 428/703
[58] Field of Search ............... 428/309.9, 310.5, 312.4, 428/314.4, 318.6, 318.8, 703, 312.2, 314.8; 106/111; 156/39, 43, 45

[56] References Cited

U.S. PATENT DOCUMENTS

| | | | |
|---|---|---|---|
| 3,516,882 | 6/1970 | Cummisford | 428/312.4 |
| 4,156,615 | 5/1979 | Cukier | 156/39 |
| 4,288,263 | 9/1981 | Delcoigne et al. | 428/703 |
| 4,298,394 | 11/1981 | Loeming et al. | 106/111 |
| 4,327,146 | 4/1982 | White | 428/312.4 |
| 4,351,867 | 9/1982 | Mulvey et al. | 428/703 |
| 4,618,370 | 10/1986 | Green et al. | 156/39 |

FOREIGN PATENT DOCUMENTS

772581  4/1957  United Kingdom ............. 428/312.4

*Primary Examiner*—William J. Van Balen
*Attorney, Agent, or Firm*—Griffin, Branigan & Butler

[57] ABSTRACT

In the improved gypsum board in accordance with this invention, the board has a gypsum core and first and second cover sheets of fibrous material on opposing faces. The core has a first stratum parallel to and adjacent the first cover sheet. This stratum does not contain any fibers of the fibrous material. This first stratum has relatively few voids and a substantially greater density than the central portion of the core of the board. The central portion of the core has a plurality of relatively large discrete voids substantially uniformly distributed throughout the central portion of the core. These voids have substantially spherical coherent walls.

9 Claims, 10 Drawing Sheets

FIG. 1

FIGURE 2
GYPSUM BOARD CORE SPECIFIC GRAVITY PROFILE

| PRODUCT: | | STRATUM 1 | STRATUM 3 | THICKNESS | CENTRE/SPECIFIC GRAVITY | STRATUM 2 |
|---|---|---|---|---|---|---|
| #1 | 1 | 0.768 | 0.635 | .333 | 0.645 | 0.641 |
|    | 2 | 0.797 | 0.677 | .333 | 0.645 | 0.677 |
| #2 | 1 | 0.876 | 0.602 | .328 | 0.662 | 0.597 |
|    | 2 | 0.862 | 0.644 | .324 | 0.670 | 0.644 |
| #3 | 1 | 0.718 | 0.736 | .315 | 0.657 | 0.824 |
|    | 2 | 0.764 | 0.675 | .315 | 0.653 | 0.726 |
| #4 | 1 | 0.844 | 0.715 | .308 | 0.672 | 0.811 |
|    | 2 | 0.863 | 0.726 | .311 | 0.671 | 0.749 |
| #5 | 1 | 0.729 | 0.753 | .312 | 0.702 | 0.781 |
|    | 2 | 0.692 | 0.710 | .313 | 0.713 | 0.669 |
| #6 | 1 | 0.661 | 0.666 | .329 | 0.607 | 0.660 |
|    | 2 | 0.708 | 0.641 | .329 | 0.608 | 0.680 |
| #7 | 1 | 0.545 | 0.869 | .319 | 0.664 | 0.539 |
| Control Sample | | | | | | |
| 7.0 lbs/cu.ft | | 0.843 | 0.673 | .319 | 0.662 | 0.906 |
| NEW PRODUCT | | | | | | |
| 10.4 lbs/cu.ft | | 0.984 | 0.716 | .316 | 0.672 | 0.963 |
| 13.0 lbs/cu.ft | | 1.343 | 1.062 | .316 | 0.693 | 1.242 |
| 14.5 lbs/cu.ft | | 1.270 | 1.102 | .311 | 0.688 | 1.210 |

| FOAM DENSITY lbs/ft³ | AVERAGE CORE DENSITY TO 0.005 BELOW PAPER INTERFACE G/cm³ | | NAIL PULL RESISTANCE LBF | HUMIDIFIED BOND | | COMPRESSIVE STRENGTH SLURRY PSI | HUNTER HARDNESS FIELD LBF | COMPRESSIVE STRENGTH BOARD PSI | | FLEXURAL STRENGTH LBF | CORE BUBBLE POPULATION NO./in² | CALCULATED BOARD WEIGHT lbs/MSF |
|---|---|---|---|---|---|---|---|---|---|---|---|---|
| | IVORY | GREY | | LBF | %FAIL | | | FACE UP | FACE DOWN | | | |
| 7.0 | 0.843 | 0.906 | 98 | 15 | 74 | 680 | 16 | 575 | 579 | 54/59 176/166 | 7,040 | 1,698 |
| 10.4 | 0.984 | 0.963 | 103 | 18 | 46 | 716 | 18 | 598 | 623 | 54/53 170/156 | 6,400 | 1,710 |
| 13.0 | 1.343 | 1.242 | 112 | 20 | 0 | 707 | 18 | 695 | 653 | 54/51 174/161 | | 1,751 |
| 14.5 | 1.270 | 1.210 | 119 | 20 | 0 | 760 | 19 | 670 | 675 | 54/53 163/161 | 3,200 | 1,728 |

FIG. 9

FIG. 10 GYPSUM BOARD CORE SPECIFIC GRAVITY PROFILE

FIG. 11
GYPSUM BOARD CORE SPECIFIC GRAVITY PROFILE
10.4 lbs/cu.ft

FIG. 12
GYPSUM BOARD CORE SPECIFIC GRAVITY PROFILE
14.5 lbs/cu.ft

GYPSUM BOARD CORE SPECIFIC GRAVITY PROFILE
13 lbs/cu.ft

FIG. 13

GYPSUM BOARD CORE SPECIFIC GRAVITY PROFILE
11.7 lbs/cu.ft

FIG. 14
(PRIOR ART)

GYPSUM BOARD CORE SPECIFIC GRAVITY PROFILE
8.9 lbs/cu.ft

FIG. 15 (PRIOR ART)

GYPSUM BOARD CORE SPECIFIC GRAVITY PROFILE
13 lbs/cu.ft

FIG. 16 (PRIOR ART)

GYPSUM BOARD

The invention relates to an improved gypsum board and particularly to a gypsum board having an increased density stratum at the portion of the core near the gypsum paper interface.

Typically, in the manufacture of gypsum board a pregenerated foam is added to the board core slurry mix to decrease the weight of the gypsum board. This foam is generated from a mixture of a liquid foaming agent, air and water in a suitable foam generating apparatus. The foamed gypsum slurry is then deposited upon a moving paper substrate which, itself, is supported on a long moving belt. A second paper substrate is then applied on top of the slurry to constitute the second face of the gypsum board and the sandwich passes through a forming station which determines the width and thickness of the gypsum board. In such a continuous operation the gypsum slurry begins to set immediately after forming. When sufficient setting has occurred the board is cut into commercially acceptable lengths, typically eight feet, and then passed into a board dryer. Thereafter the board is trimmed to length, bundled in pairs and stored prior to sale.

Those familiar with the manufacture of gypsum board will be familiar with the various kinds of product quality failures which are typically experienced within the industry. One of these types of failure is known as a "splitter". In a "splitter" type of failure the paper forming one of the faces of the board is easily separated from the board when the board is cut, normally during board application in very humid conditions. In the "splitter" failure, when the paper facing separates from the board it takes with it a portion of the set gypsum. There is no paper remaining on the core of the board after failure and there is a layer of gypsum on the face of the paper. A second type of failure which is often experienced is known in the trade as a "peeler". In this type of failure there is little or no gypsum adhered to the paper and no paper is left on the gypsum panel after failure.

Heretofore many efforts have been made to enhance the so-called paper/gypsum "bond". Typical of efforts to enhance the paper/gypsum "bond" are those set out in U.S. Pat. No. 4,327,146 which issued Apr. 27, 1982. This patent teaches the method of manufacture of gypsum board in which there is theoretically obtained a better growth of gypsum crystals into the interstices of paper and thus it is felt an enhanced paper/gypsum "bond" is obtained.

Quite surprisingly we have discovered that the major plane of weakness which effects so-called "splitter" failures is not the "bond" between the paper and the gypsum crystals but rather the strength of the core itself in the stratum adjacent to the paper. Vastly improved gypsum board may be obtained by enhancing the strength of this stratum adjacent to the paper. In particular, the stratum which may most advantageously enhance the quality of the gypsum board is that narrow stratum which is immediately adjacent to the paper but which does not contain any of the paper fibres.

As is typical in the manufacture of gypsum board today, the core, at least in the central region, advantageously contains a number of voids which reduce the density of the gypsum and thus the weight of the board for a given thickness. Previously it has been thought that the best results can be obtained by ensuring that the core, comprises as many voids as possible. It has previously been thought that such voids should be of as small a nature as possible. To this end heretofore, the products which are used as foaming agents are used in such a manner as to create as many bubbles in the foam as possible when passed through a foam generator. It is desired and expected that these bubbles will exist when the pregenerated foam is mixed with the gypsum slurry and that the bubbles in the foam will then lead to small evenly distributed voids in the set gypsum.

Rather surprisingly, we have found that the resulting gypsum board can be significantly strengthened by the creation of larger voids in the set gypsum than has been the practice heretofore. We have found that the creation of voids of a substantially spherical configuration provides an enhanced gypsum board. Preferably the voids are coherent, that is to say, each individual void is intact and does not extend substantially into adjacent voids. We have also noted that an improved product results when the voids are spaced one from another and the resultant core thus comprises a plurality of such substantially spherical voids with the gypsum between voids being substantially solid, that is to say, without significant voids. The term "discrete" is used in this disclosure and claims to describe this structure.

In the improved gypsum board in accordance with this invention, the board has a gypsum core and first and second cover sheets of fibrous material on opposing faces. The core has a first stratum parallel to and adjacent the first cover sheet. This stratum does not contain any fibers of the fibrous material. This first stratum has relatively few voids and a substantially greater density than the central portion of the core of the board. The central portion of the core has a plurality of relatively large discrete voids substantially uniformly distributed throughout the central portion of the core. These voids have substantially spherical coherent walls.

The invention may be better understood from reference to the following description and drawings which illustrate a preferred embodiment of the invention, and in which.

Figure 1:
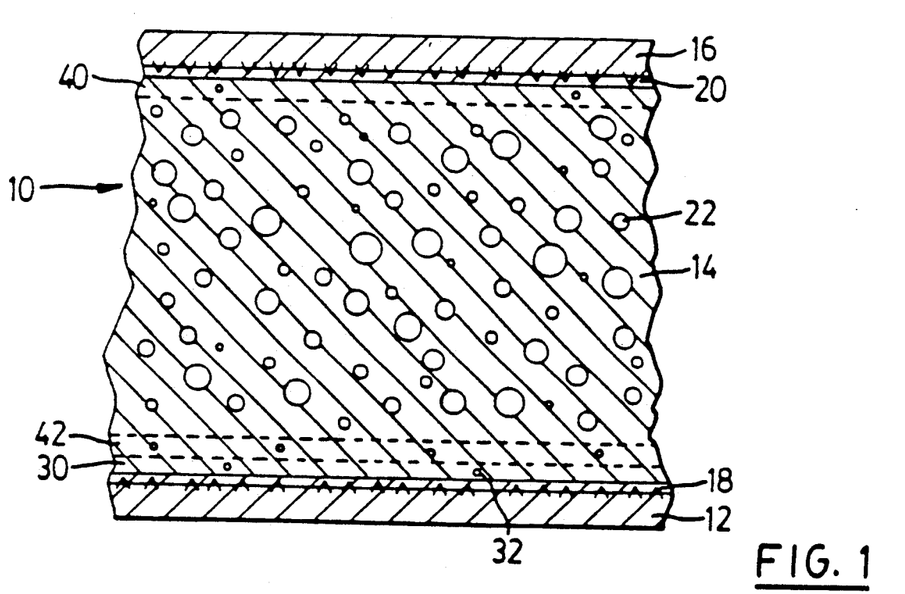
FIG. 1 is a drawing of a cross-section through the improved gypsum board.

FIG. 1 illustrates a portion of a transverse section taken through the improved board. This type of section is typically made through gypsum board by scoring through one paper face and snapping or breaking the board. This gives a substantially planar surface. In this specification the term "scoring and snapping" is used to describe the method of creating this plane. The drawing is not to scale but illustrates the significant features of the improved board. The board 10 comprises a first paper surface 12, a set gypsum core indicated generally as 14 and a second paper surface 16. Typically in the manufacture of such board the gypsum slurry is deposited upon the first paper surface 12 and thereafter the second paper 16 is applied on top of the gypsum slurry. As will be well understood by those familiar with this art the gypsum board may be passed through nip rolls or other forming devices to establish the thickness of the board. The board is usually made in a ribbon about 4 feet wide. After initial setting the board is cut into lengths and dried. In such a board the gypsum crystals at the surfaces of the core extend into the interstices in the paper. There is a layer of interlinked gypsum crystals and paper fibres which is indicated adjacent paper surface 12 by the layer identified as 18. There is similarly a layer of interlinked gypsum crystals and paper fibres adjacent paper surface 16, identified by the numeral 20.

The central portion of the core 14 comprises set gypsum and contains a plurality of randomly located but substantially evenly spaced voids. The voids identified typically by the numeral 22 are substantially spherical. As the voids are located randomly throughout the set gypsum the apparent diameter in the plane illustrated will vary. Where the plane passes through the diameter of a void, the true size of the void is shown in FIG. 1. Where the void is displaced from the plane then the size of the void would appear different simply from its location in front of or behind the plane. The voids themselves however also vary in size.

In the improved board according to this invention the voids are considerably larger than have been utilized heretofore. It will be observed that in FIG. 1 the voids are shown as being substantially coherent. The voids do not extend for the most part into adjacent voids. In addition, it is observed from FIG. 1 that the spaces between the voids do not contain substantial numbers of voids of smaller size. Rather the space between the voids is substantially solid set gypsum. In this disclosure and claims the term discrete is used to describe this solid structure between the voids.

In FIG. 1 there is shown a first stratum 30 which is adjacent to the first paper layer 12. The stratum 30 as shown is approximately 0.005" in thickness. The stratum is located parallel to and adjacent to the paper surface 12. The stratum 30, however, does not contain any fibers from the paper surface 12 and thus does not include any of the layer identified as 18 in FIG. 1. This first stratum 30 does not contain any substantial number of voids. As shown in FIG. 1, there may be small voids such as that identified by the numeral 32. However, for the most part, the first stratum 30 comprises a layer of substantially solid gypsum. As the first stratum 30 does not contain any substantial number of voids it will have a significantly higher average density than the density of the central portion of the core 14.

There is a second stratum 40 located adjacent the paper surface 16. Second stratum 40 is adjacent to and parallel to the paper surface 16 but does not include any fibers from the paper surface 16. The stratum 40 is also approximately 0.005" in thickness. This second stratum also contains substantially no voids and thus has a significantly higher average density than the central portion of the core 14.

Preferably there is a third stratum 42 adjacent to and parallel to first stratum 30. The stratum 42 is also approximately 0.005" in thickness and contains a few more voids than are contained in the first stratum but significantly less voids than are present in the central portion of the core 14.

In one method of analysing the improved board of this invention and the existing boards manufactured by ourselves and various competitive boards, the following approach was used. In each case the paper layers were mechanically shaved in several steps from a commercially satisfactory board product until there was no paper adhering to the core and the remaining board was accurately weighed. Thereafter, utilizing the same shaving process the first core stratum of 0.005" was removed from each board. The remainder of the intact sample was then accurately weighed to determine the weight of the first core stratum removed. This was then used to calculate the specific gravity of the stratum which had been removed. In this manner the specific gravity of the first stratum was obtained for a number of boards. A similar process was used to obtain the specific gravity of the second and third strata. A number of other strata were then removed from each face of the board core. Finally, the specific gravity of the remaining central portion of the core 14 was obtained. In each case the central portion for which the specific gravity was obtained was approximately 0.3".

Figure 2:
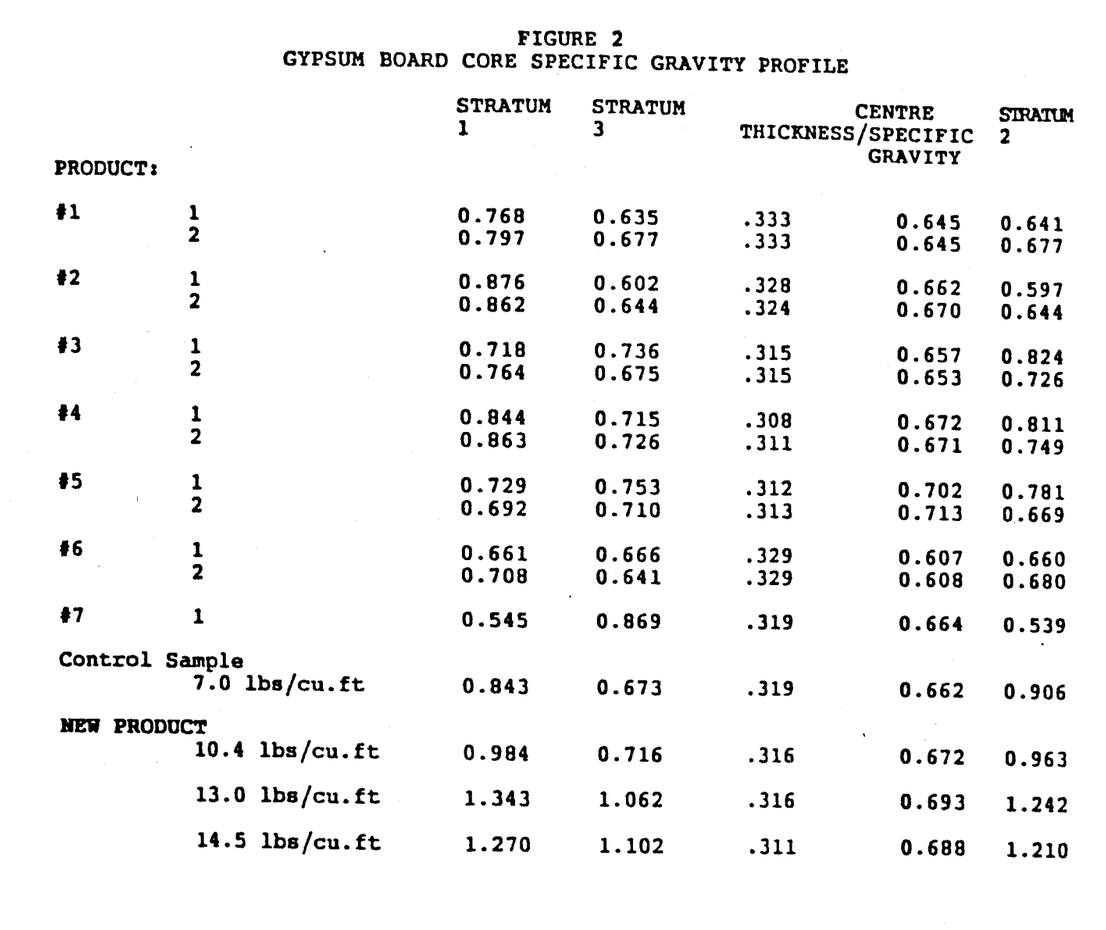
FIG. 2 is a table showing specific gravity of various strata of the improved board and compared to existing commercial products.

The results of these studies are tabulated in FIG. 2. FIG. 2 has been arranged with the first stratum and third stratum at the left hand side with the second stratum at the right hand side of the table. The columns in the centre identifies the thickness and the specific gravity of the central portion.

Boards 1 through 7 were commercially available boards obtained by purchasing acceptable market samples. Except for number 7 two samples were tested from each board. The sample marked 8 is a control sample using a novel foaming agent but not including the improved structure of this invention.

At the lower portion of table 2 test results are provided for the improved board of this invention. It will be observed that the range of specific gravity for the first stratum for the commercially available boards ranged from a low of 0.545 to 0.876 as a high. The corresponding stratum for each of the three examples of the improved board range from 0.984 to a maximum of 1.343. For the third stratum the range of the commercial product was from 0.602 to 0.869. The improved board of this invention showed a range of from 0.716 to 1.102. For the second stratum adjacent to the other face of the board, the commercial product showed a range from 0.539 to 0.824. The corresponding second stratum of the improved board showed a range from 0.963 to 1.210.

Figure 3:
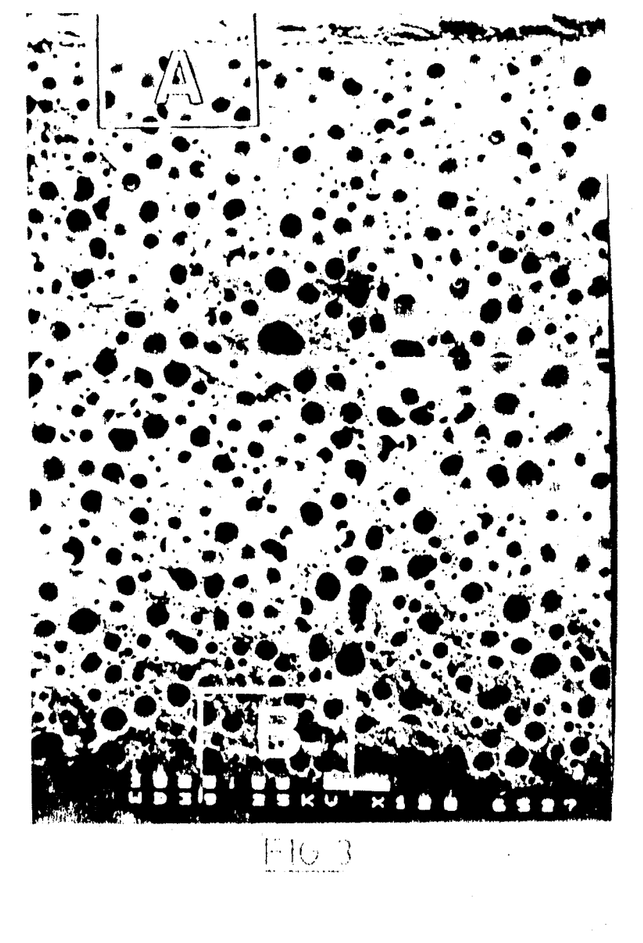
FIG. 3 is a scanning electron microscope photograph of the improved board.
Figure 4:
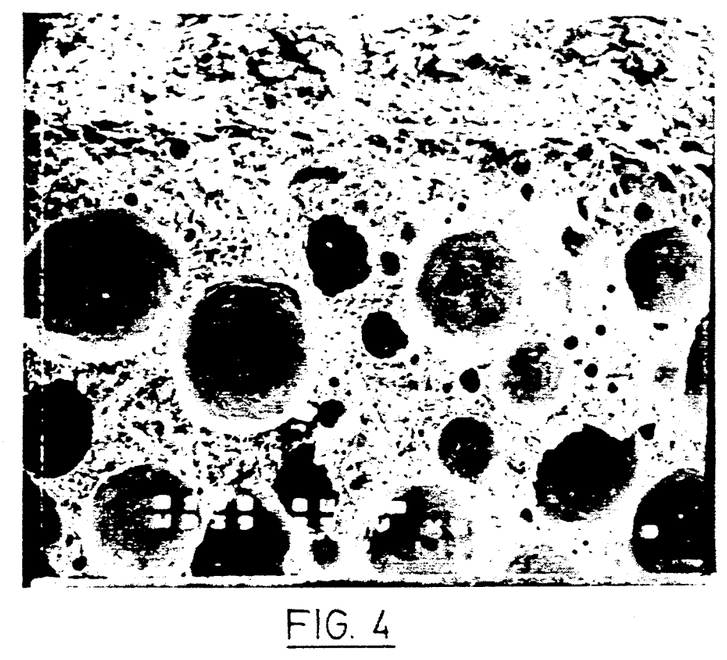
FIG. 4 is a similar photograph of a portion of FIG. 3 at increased magnification.
Figure 5:
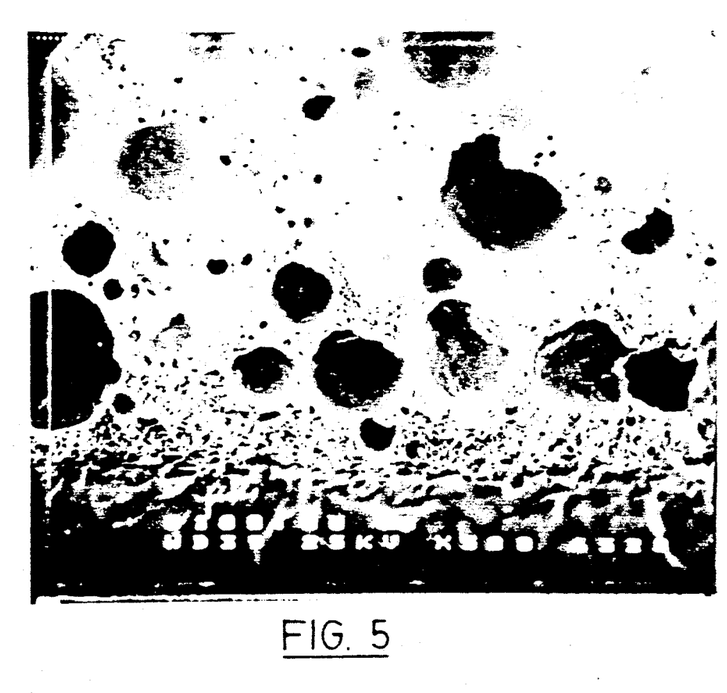
FIG. 5 is a similar photograph of a portion of FIG. 3 at increased magnification.

After manufacture of the improved board in accordance with this invention studies of the core were made using scanning electron microscopy of a scored and snapped plane. Photographs taken using this instrument are included as FIGS. 3, 4, and 5 respectively. FIG. 3 illustrates a complete board and both paper faces at 12 times magnification. FIG. 4 is a small area A from FIG. 3 at 50 times magnification. Area A illustrates the first and third stratum adjacent the first paper surface 12. FIG. 4 is of area B at 50 times magnification illustrating the second stratum adjacent the second paper surface.

Figure 6:
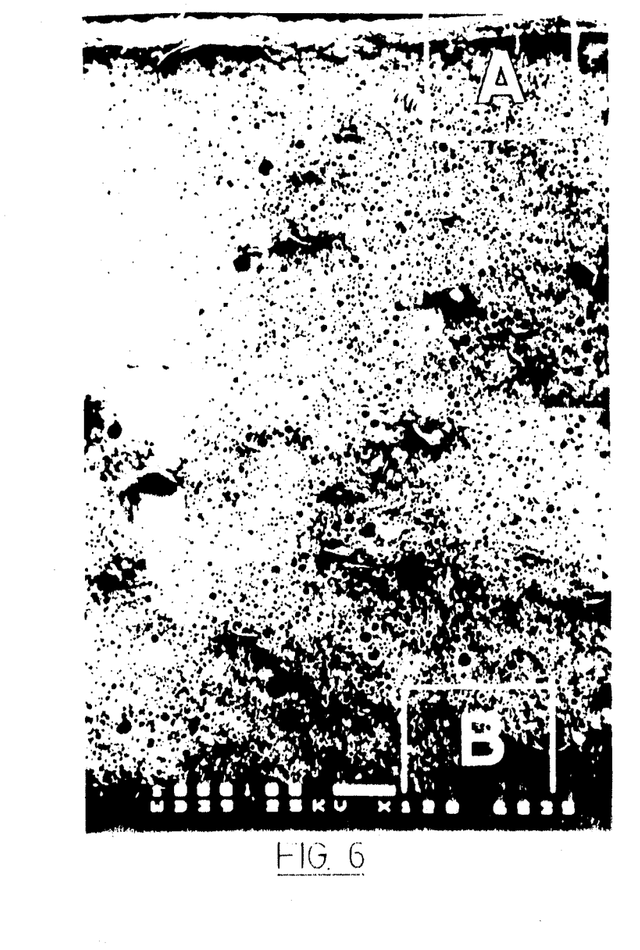
FIG. 6 is a similar photograph comparable to FIG. 3 of a prior art gypsum board.
Figure 7:
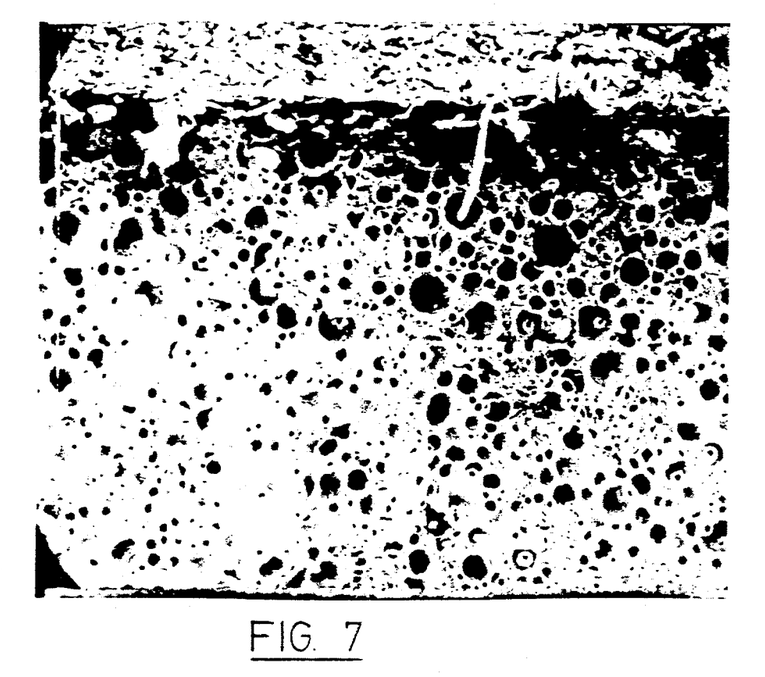
FIG. 7 is a similar photograph of a portion of FIG. 6 at increased magnification.
Figure 8:
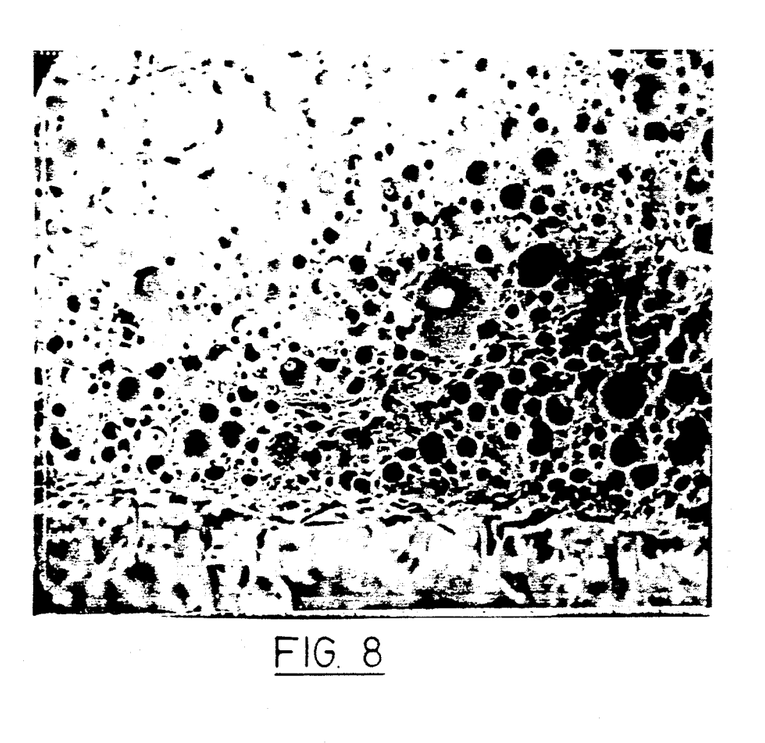
FIG. 8 is a similar photograph of a portion of FIG. 6 at increased magnification.

For comparison purposes similar photographs of a commercially available board of similar magnification show the marked difference which exists between it and the improved board. FIG. 6 compares directly with FIG. 3, while FIGS. 7 and 8 compare directly with FIGS. 4 and 5.

A review of these figures will show that the voids in the improved product are substantially larger than the voids in the existing commercial products. A review of, in particular, FIGS. 7 and 8 will show that the voids in the commercially existing product are relatively closely located adjacent to one another and in many instances the voids extend from one into another. The wall structure between the voids is relatively thin and the voids are themselves nowhere near as substantially spherical shaped as in the improved product. The voids in the prior art board are not coherent and the structure is not discrete.

Further analysis of the photographs provides an indication of the void population.

By counting voids in the photographs, FIGS. 4, 5, 7 and 8 and multiplying by the factor representing the area photographed, the void population per square inch may be obtained. In the conventional product, void population as shown is 68,000 per square inch approximately. By comparison, the void population in the improved product is less than 7,000 per square inch. This illustrates the significantly larger voids in the improved product.

The mechanism of board strengthening is not clearly understood, however some very surprising results have been obtained by subjecting the improved board to some of the standard tests used in the industry to evaluate this type of product.

Figure 9:
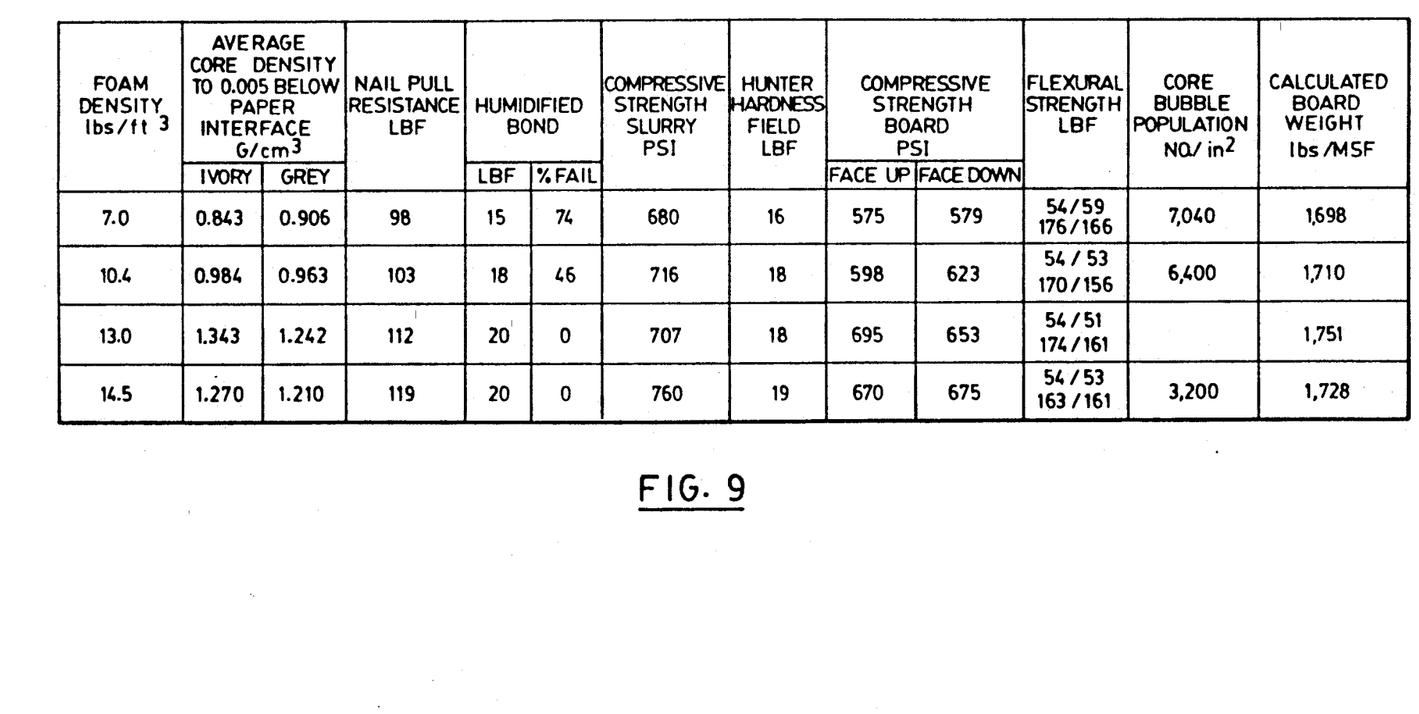
FIG. 9 is a table of characteristics of a sample of improved board.

FIG. 9 shows the results from various standardized tests conducted on ½" improved gypsum board and compared to a check specimen. FIG. 9 shows significantly increased nail pull resistance slurry compressive strength and Hunter hardness results and essentially unchanged flexural strength based upon ASTM standard test methods.

In an industry adopted test, the humidified bond strength is shown to increase with increasing foam density. The results are tabled in FIG. 9. Most significantly, the percent bond failure simultaneously dropped to 0% from a high of 74% for the control sample. At the 0% level there are no "splitter" failures.

The improved gypsum board of this invention may be manufactured using a recently developed foaming agent which is the subject matter of co-pending application Ser. No. 280,454. This foaming agent comprises an alkyl ether sulphate of the formula $CH_3(CH_2)_xCH_2(OCH_2CH_2)_y-OSO_3M$ wherein at least 90% of x is between 6 and 8 and the average y is between 0.4 and 1.3 and wherein M is a cation producing a water soluble surfactant. Previously, when generating foam for gypsum board from foaming agents the preferred thinking is that the generated foam should have as low a density as possible. We have found with use of the newly developed foaming agent that the improved board of this invention may be manufactured utilizing much higher than normal foam densities. In FIGS. 2 and 9 four different runs are tabulated. The first is the control sample run at 7.0 lbs/cu ft foam density. In the second run the foam was generated with a density of 10.4 lbs/cu ft. In the third run the foam had a density of 13.0 lb/cu ft and in the fourth run the foam had a density of 14.5 lb/cu ft. It will be observed from the table that a significant increase in the specific gravity of the first, second and third strata occurs at foam densities of 10.4 lb/cu ft and higher.

Figure 10:
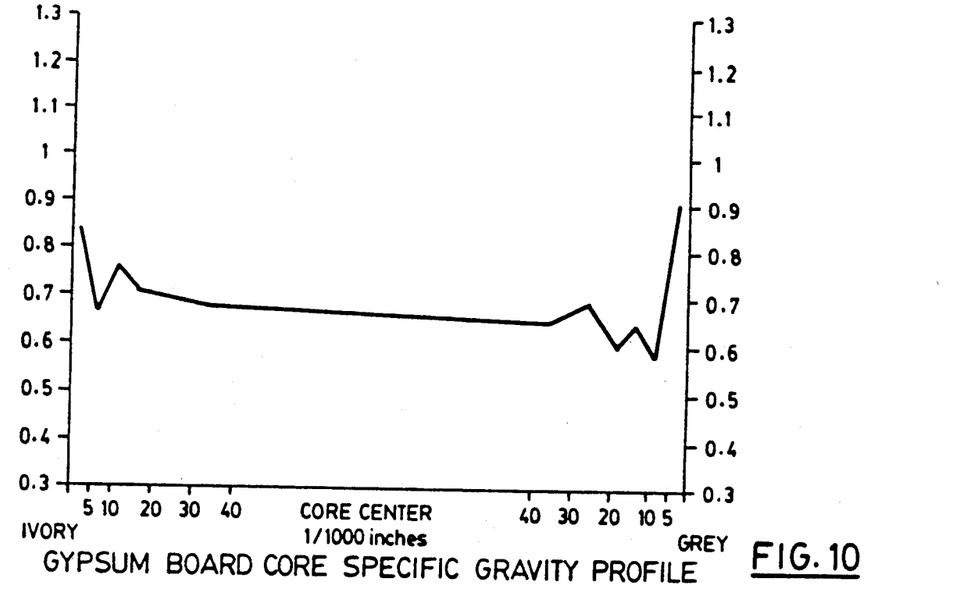
FIG. 10 is a plot of density profile for gypsum board made with a novel foaming agent but not involving the improved structure.

FIG. 10 shows the core density profile for the control sample.

Figure 11:
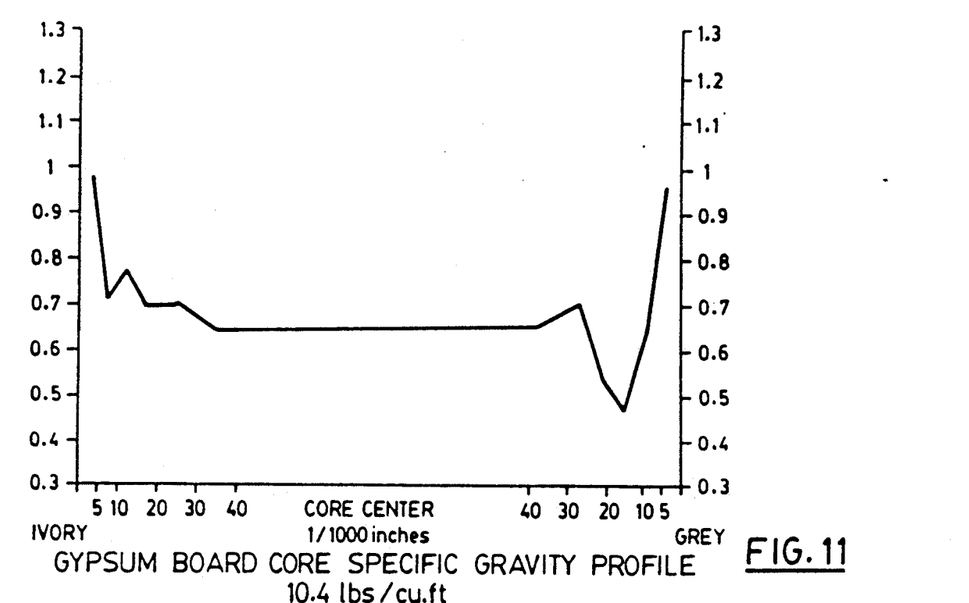
FIG. 11 is a plot of density profile for a board in accordance with this invention made with foam having a density of 10.4 lbs/cu ft.
Figure 12:
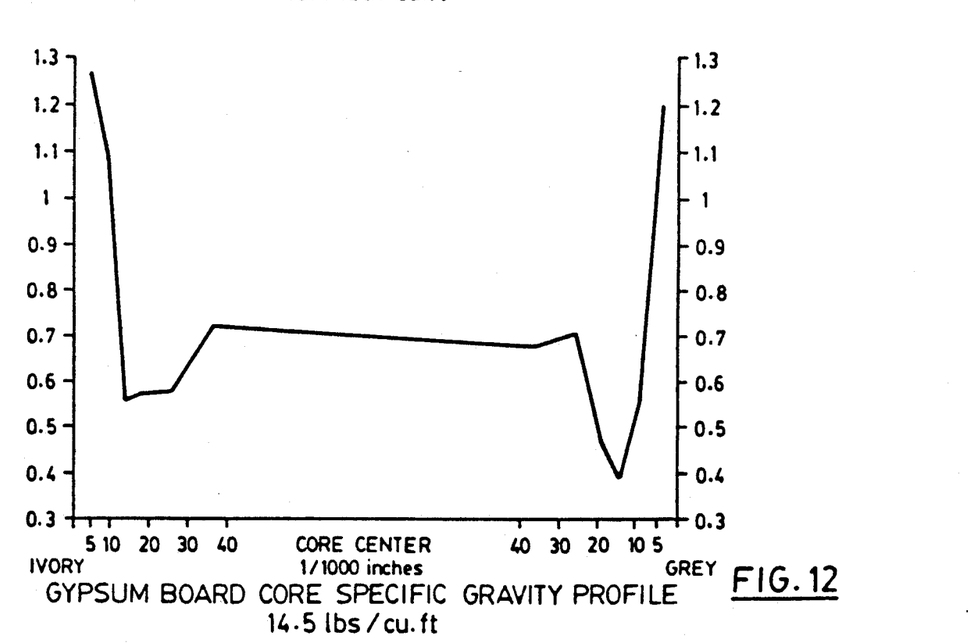
FIG. 12 is a plot of density profile for a board in accordance with this invention made with foam having a density of 14.5 lbs/cu ft.
Figure 13:
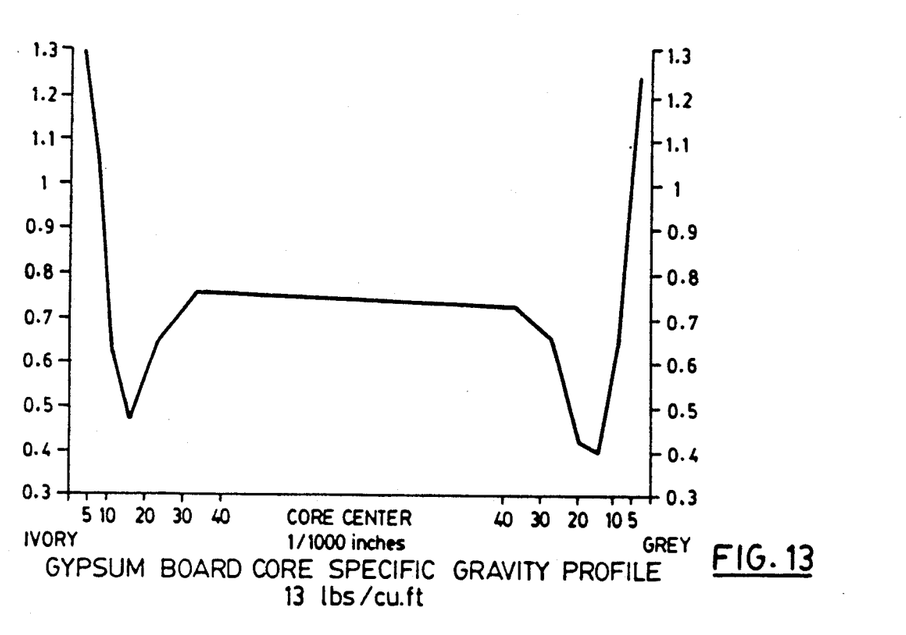
FIG. 13 is a plot of density profile for a board in accordance with this invention made with foam having a density of 13 lbs/cu ft.
Figure 14:
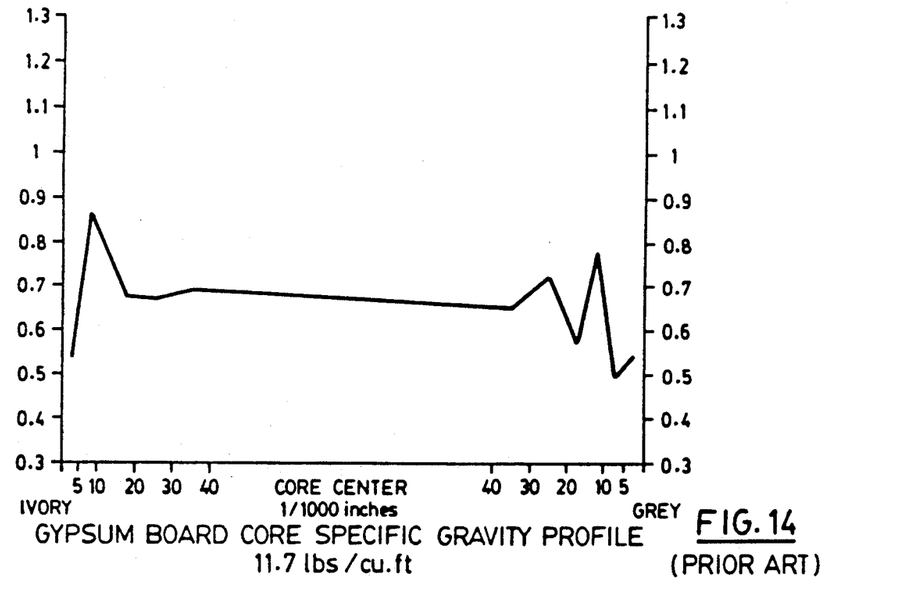
FIG. 14 is a plot of density profile for a prior art board made with foam having a density of 11.7 lbs/cu ft.
Figure 15:
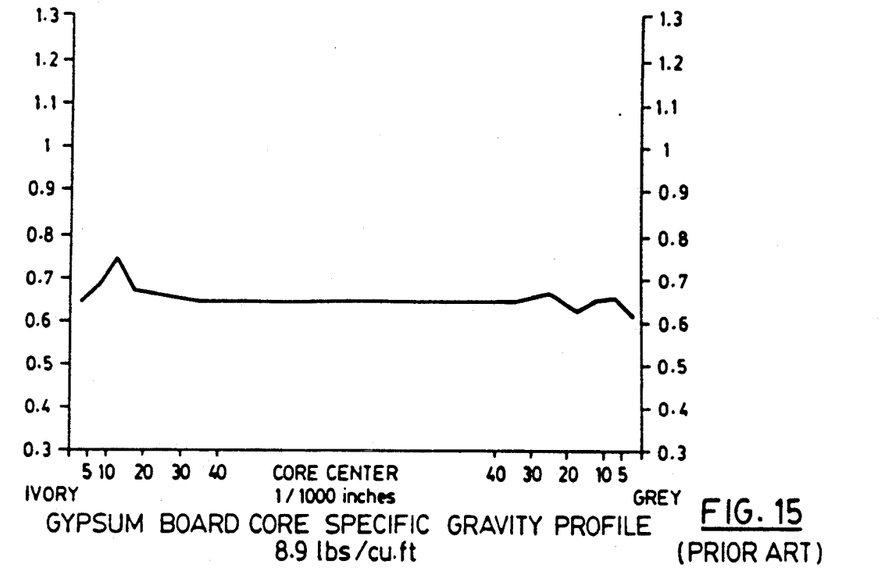
FIG. 15 is a plot of density profile for a prior art board made with foam having a density of 8.9 lbs/cu ft.
Figure 16:
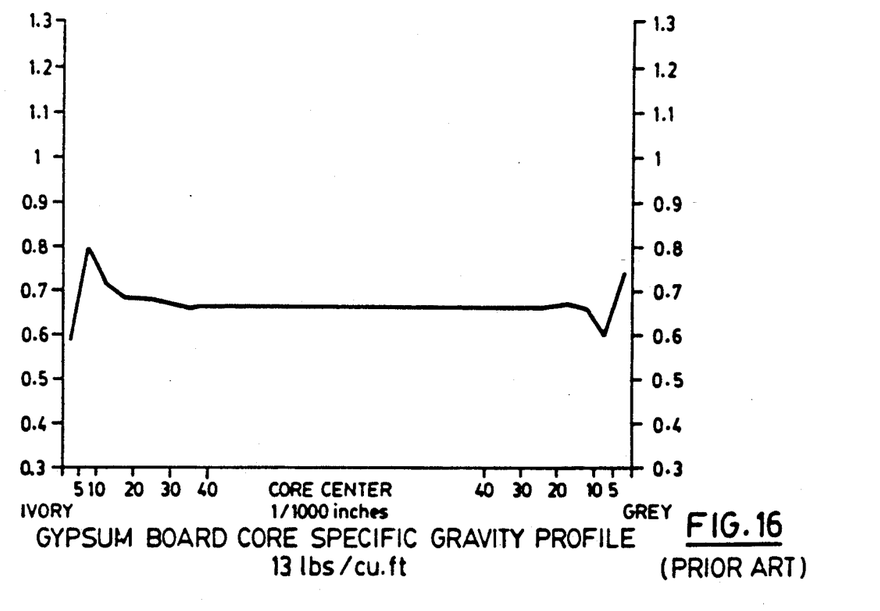
FIG. 16 is a plot of density profile for a prior art board made with foam having a density of 13 lbs/cu ft.

FIGS. 11, 12 and 13 show the core density profile of the improved board made at foam densities of 10.4, 14.5 and 13 lbs/cu ft respectively. FIGS. 14, 15 and 16 show the core density profile for a previously available commercial board made with foam densities of 11.7, 8.9 and 13 lbs/cu ft respectively. Comparison of these figures shows the increased density of the first, second and third strata of the improved board as compared to the previous product. In the improved board, the density of the first and third strata is at least 0.95 and preferrably at least 1.1.

The improved product can be made using the foaming agent specified above and using conventional gypsum board equipment. The foaming agent is diluted in water and passed through a typical foam generator to entrain air and form bubbles. The pregenerated foam is then fed to a gypsum core slurry mixer together with gypsum stucco and additives and any additional water desired. The resultant mixed slurry is continuously deposited to form a sandwich between two paper surfaces according to conventional gypsum board making techniques.

In describing the preferred embodiment illustrated, reference has been made to the paper surfaces 12 and 16. This invention is not limited to gypsum board having such paper surfaces. The invention is also applicable to gypsum board having other fibrous surfaces and also to specialized gypsum board such as fire rated board, sheathing board, moisture resistant board and the like.

Various other changes to the invention may be made without departing from the spirit of the invention as defined in the following claims.

We claim:

1. Wallboards, suitable for use in constructing interior walls and ceilings of buildings, comprising:
   (1) a core of foamed gypsum with a multiplicity of relatively large voids substantially uniformly distributed therethrough and having a first specific gravity, said core having top, bottom, side and end surfaces, with the top and bottom surfaces being substantially parallel to each other;
   (2) fibrous material cover sheets disposed on and in substantially the entire top and bottom surfaces, wherein interfaces between the fibrous material cover sheets and the top and bottom surfaces of the gypsum core are established and wherein the interfaces are a mixture of fibers from the cover sheets and gypsum from the core; and
   (3) a first stratum of the gypsum core wherein said first stratum does not contain any substantial number of voids, has a specific gravity of at least 0.95, has a specific gravity significantly greater than said first specific gravity and is disposed substantially parallel to and substantially next to at least one of said interfaces, but spaced from said interface a distance sufficient that fibers of said cover sheet disposed in said interface do not substantially protrude into said stratum and said stratum is substantially free from said fibers.

2. The gypsum board of claim 1, wherein said core has a second of said stratums adjacent to the other interface.

3. The gypsum board of claim 2, said core having a third stratum adjacent said first stratum, said third stratum having a specific gravity density substantially greater than the central portion of the core but less than the specific gravity density of said first stratum.

4. The board of claim 1, wherein said first stratum is about 0.005" in thickness.

5. The board of claim 2 wherein said second stratum is about 0.005" in thickness.

6. The board of claim 4, wherein said first stratum has a specific gravity of at least 1.1.

7. The board of claim 5, wherein said second stratum has a specific gravity of at least 1.1.

8. The board of claim 3, wherein said third stratum has a specific gravity of at least 0.7.

9. The board of claim 1 wherein said core has a void population of not greater than 7,000 voids per square inch of surface area of a plane formed by scoring and snapping said board.

* * * * *

UNITED STATES PATENT AND TRADEMARK OFFICE
CERTIFICATE OF CORRECTION

PATENT NO. : 5,085,929

DATED : February 4, 1992

INVENTOR(S) : R. BRUCE and Dimitrios MITAKIDIS

It is certified that error appears in the above-identified patent and that said Letters Patent is hereby corrected as shown below:

Column 7: Claim 3, line 15, after "2,", insert --wherein--.
Column 7: Claim 3, line 15, change "having" to --has--.
Column 7: Claim 3, line 17, delete "density".
Column 8: Claim 3, line 2, delete "density".

Signed and Sealed this

First Day of June, 1993

Attest:

MICHAEL K. KIRK

Attesting Officer

Acting Commissioner of Patents and Trademarks